US 6,590,536 B1

(12) United States Patent
Walton (10) Patent No.: US 6,590,536 B1
(45) Date of Patent: Jul. 8, 2003

(54) BODY MOTION DETECTING SYSTEM WITH CORRECTION FOR TILT OF ACCELEROMETERS AND REMOTE MEASUREMENT OF BODY POSITION

(76) Inventor: Charles A. Walton, 19115 Overlook Rd., Los Gatos, CA (US) 95030

( * ) Notice: Subject to any disclaimer, the term of this patent is extended or adjusted under 35 U.S.C. 154(b) by 0 days.

(21) Appl. No.: 09/640,556

(22) Filed: Aug. 18, 2000

(51) Int. Cl.[7] .................................................. G01S 3/02
(52) U.S. Cl. ........................................................ 342/463
(58) Field of Search ................................ 342/437, 463, 342/464, 465

(56) References Cited

U.S. PATENT DOCUMENTS

| | | | | |
|---|---|---|---|---|
| 4,740,790 A | * | 4/1988 | Hess et al. ................... | 342/361 |
| 5,093,649 A | * | 3/1992 | Johnson ....................... | 342/157 |
| 5,467,083 A | * | 11/1995 | McDonald et al. ......... | 340/854.6 |
| 5,541,608 A | * | 7/1996 | Murphy et al. ............. | 342/442 |
| 5,608,411 A | * | 3/1997 | Rose ............................ | 342/417 |

* cited by examiner

Primary Examiner—Dao Phan (57) ABSTRACT

A body motion detector system which combines body exercise with game playing. The body motions are displayed in various forms of challenging games, causing increased user satisfaction in exercise. Body motion is sensed, in a preferred form, by accelerometer transducers mounted on the body. The accelerometer readings are transmitted by radio signals to a base station, a computer, and a display. The receiving station has multiple antennas, as does the transmitting station. The antenna field patterns are analyzed by calculations within the receiver, finding the angular orientation of the body and the body angle of tilt. The computer corrects for errors caused by the effects of gravity on tilted accelerometers. The corrected accelerometer readings are integrated to obtain body motion data.

5 Claims, 11 Drawing Sheets

BODY MOTION DETECTING SYSTEM WITH CORRECTION FOR TILT OF ACCELEROMETERS AND REMOTE MEASUREMENT OF BODY POSITION

FIELD OF THE INVENTION

This invention serves a purpose in the joint fields of exercise systems combined with game playing. This invention adds to the game and exercise functions the use of a radio link, accelerometers, and radio antennas. This invention measures motions of a remote body. This invention is also useful in fields which need to determine remote body motion in a simple manner.

BACKGROUND

It is desirable to be able to measure motion of a remote body, using the simplest possible configuration of transducers and radio transmitters. This need arises in systems which aid exercise. Motion of a body can be detected with accelerometers. The accelerometer data is reported to a computer, by wire or radio, and calculations are performed to obtain velocity and position values.

A troublesome error, which this invention overcomes, arises when the accelerometers tilt away from their normal horizontal or vertical positions. The tilt comes from rotational motion of the body, usually rotation of the human body in the vertical plane. The force of gravity makes tilt look like motion, and therefore the tilt is a form of noise, or unwanted data.

This error has caused accelerometers not to be used in some applications, and has caused use of other more complicated motion reporting systems. One of these other systems is to place brightly marked coverings, or leggings and sleeving, on the moving body, and tracking the motion with optical systems, such as a video camera. An equivalent system places bright jewels or reflective elements on the body. These optical systems have the disadvantage of requiring special unnatural attachments. They also have trouble functioning well in bright ambient light, or in lighting conditions where undesired bright reflections occur.

Another system for reporting body motion is to place on all joints of the moving body angular position sensors, and to report the readings of the angular sensors to a computer system.

Applications for such motion detection include: sports movement study, from golf to tennis to baseball (batter swing) to football (blocking) and to running and pole vaulting. Another application is study of moving bodies so that games and animation displaying human and animal bodies can be made to look highly realistic, and to minimize stiffness often seen in animation.

Electronic games are popular and interest is growing. The operator sits before a screen, and uses a hand controller, and sometimes also a foot and head controller, to steer and operate while watching the screen. There is no whole body exercise. This invention adds to the value of games by providing concurrent exercise, and adds to the value of exercise by incorporating the entertainment of game play.

The present inventions describes a method and system for reporting body motion, accurately, without need for painted and brightly colored bodies, and without need for angle sensing devices attached to the various points, and independent of ambient lighting effects and variations. The present invention uses accelerometers and adds a correction for the tilt of the body.

The invention is also valuable, in general, for measuring tilt, or angular orientation, of a remote device, regardless of distance, without accelerometers.

BACKGROUND COMMENTS ON THE PHENOMENA OF ACCELERATION AND GRAVITY

One of the concepts in physics of both Newton and Einstein is that both acceleration and gravity produce the same indistinguishable effect on a mass. Acceleration is changing motion, which mass resists, the resistance being a force, with the relationship described by the basic formula F=MA. F is the force, M is the mass, and A is the acceleration. Yet a force equal to and indistinguishable from acceleration can also be produced by no motion at all, by simply residing in a gravitational field. An observer within the mass, having only scales to measure force, cannot tell which of the actions, one with substantial motion, the other with none, is producing the force. No experimenter has found a way to allow the observer to tell which of the two sources produces the force, nor find a difference in the two forces. This phenomenon explains in part why accelerometers mounted to a body free to move, and residing in a gravitation field, are unable to tell from their readings, whether the body is moving, or is merely tilting within a gravitational field. Some other means of sensing must be brought into play, namely something to measure tilt within the gravity field, as described in this invention.

PRIOR ART DISCLOSURES

The prior art includes several patents, some by the present inventor. This invention evolves from the first patent listed below. Other patents follow.

1. U.S. Pat. No. 5,989,157: Exercising System With Inertial Game Playing. This patent provides for a person to both exercise and to play games. Exercising is made more fun and less boring, and game playing is made more worthwhile by working full body stimulation and acquisition of body physical skills. There is a need to add to electronic game entertainment the larger benefits of whole body exercise, or conversely, to add to large muscle exercise the fun of electronic game entertainment. This patent describes a game playing exerciser.

2. U.S. Pat. No. 4,782,342: Proximity Identification System With Lateral Flux Paths, by Charles Walton, covers rod to coil and rod-to-rod radio coupling, which are used in a different way in this current invention.

3. U.S. Pat. No. 4,888,474: Proximity Identification System With Lateral Flux Magnetic Rod Coupling. Shows further variations of the rod to rod and loop to loop antennas utilized in this current invention.

4. U.S. Pat. No. 4,925,189: Body Mounted Video Game Device, by Thomas F. Brauenig. Inertially operated switches are mounted on the users body and control a game display on the screen. Inertially operated switches are simple on-off devices and do not have the linear infinitely variable quality of accelerometers, and also these switches cannot distinguish between actuation caused by acceleration and action caused by tilt or angular deviation. That is, a switch can be made to close by rapid movement, or a switch can be made to close by sufficient tilt and letting gravity cause the action. Means for distinguishing the two effects is a primary portion of this current invention.

5. U.S. Pat. No. 5,645,513 Exercising Apparatus which Interacts with a Video Game Apparatus During Exercise.

For feedback from the user, this invention uses either interrupted light beams or body mounted switches. It lacks the smoother infinitely variable more sophisticated control possible with analog devices such as accelerometers. It will respond to position indicators but not to velocity or acceleration values. Large shifts in body position are not possible.

6. For reading accelerometers mounted on a mobile body, and with display responsive to motion of the body, there is published prior art, which includes an article in Poptronics magazine, May 2000, pages 49–54, titled: "Robotics, Tilt Sensors", enclosed. This technical article describes sensing tilt by accelerometers, but not motion itself, or any other function.

7. At health clubs, several types of electronic interaction between machine and user have been tried. Walking or stride machines report pace and distance covered. Heart beat rate is measured and sensed several ways. A voice report with audible heart beat and audible muscle effects adds interest. There is little or no game playing.

8. Other competing art uses rigid angle sensing devices clamped to the limbs of a user to sense and report angular position of various limbs relative to one another, or there are specially color coded bars on the limbs to visually record angular positions.

SUMMARY DESCRIPTION OF THE PRESENT INVENTION

A primary use of the invention is to improve systems which combine exercise with game playing. The invention makes practical the use of accelerometers on the human body to report body motion and control displays on a viewing screen. There is a short range radio link from the body to the base station.

The invention corrects for errors induced by gravity upon the accelerometers. The invention uses the signals received at a base station from transmitting antennas on a remote body, to determine the tilt angle and to measure the acceleration of the body.

Knowledge of the angular position of the body allows correction for the effects of gravity upon accelerometers attached to the body. The angular knowledge is obtained by measuring the polarization quality of signals from loop and rod antennas.

The receiving station, or base station, carries multiple antennas which selectively respond to the polarized waves. The receiving antennas are typically at right angles to one another. The signal strength, or reading, from the receiving antennas is digitized, that is, converted to a digital value, by analog to digital converters, and are thus put into digital form accepted by the computer. From the relative signal strengths received the angular orientation, also referred to as tilt angle, of the transmitting antennas is determined.

From the tilt angle, corrections for gravity effects in two or more dimensions are applied to the accelerometer values, and then integration is applied to obtain the position value. The calculated position is typically displayed on a television or computer type monitor.

A secondary object of the present invention is to aid a person desiring to stay in good health through exercise, by combining the requirement for vigorous motion with the mental stimulation associated with playing electronic games.

The moving device may be an object, or the instruments may be mounted on a human body. Other uses are for studying dance movements, or athletic competition movements, or for controlling unmanned intelligent transport vehicles, or for reporting positions of portions of machinery. In some applications the angular orientation of remote bodies is of interest even with out accelerometer readings.

The preferred form of modulation of the polarized radio signal is pulse width modulation, where the width of the pulse represents the magnitude of the accelerometer transducer reading, or other transducers. An alternative form of modulation is to digitize the transducer values and to send data by digital pulse modulation.

DETAILED DESCRIPTION OF THE PREFERRED EMBODIMENT

Figure 1:
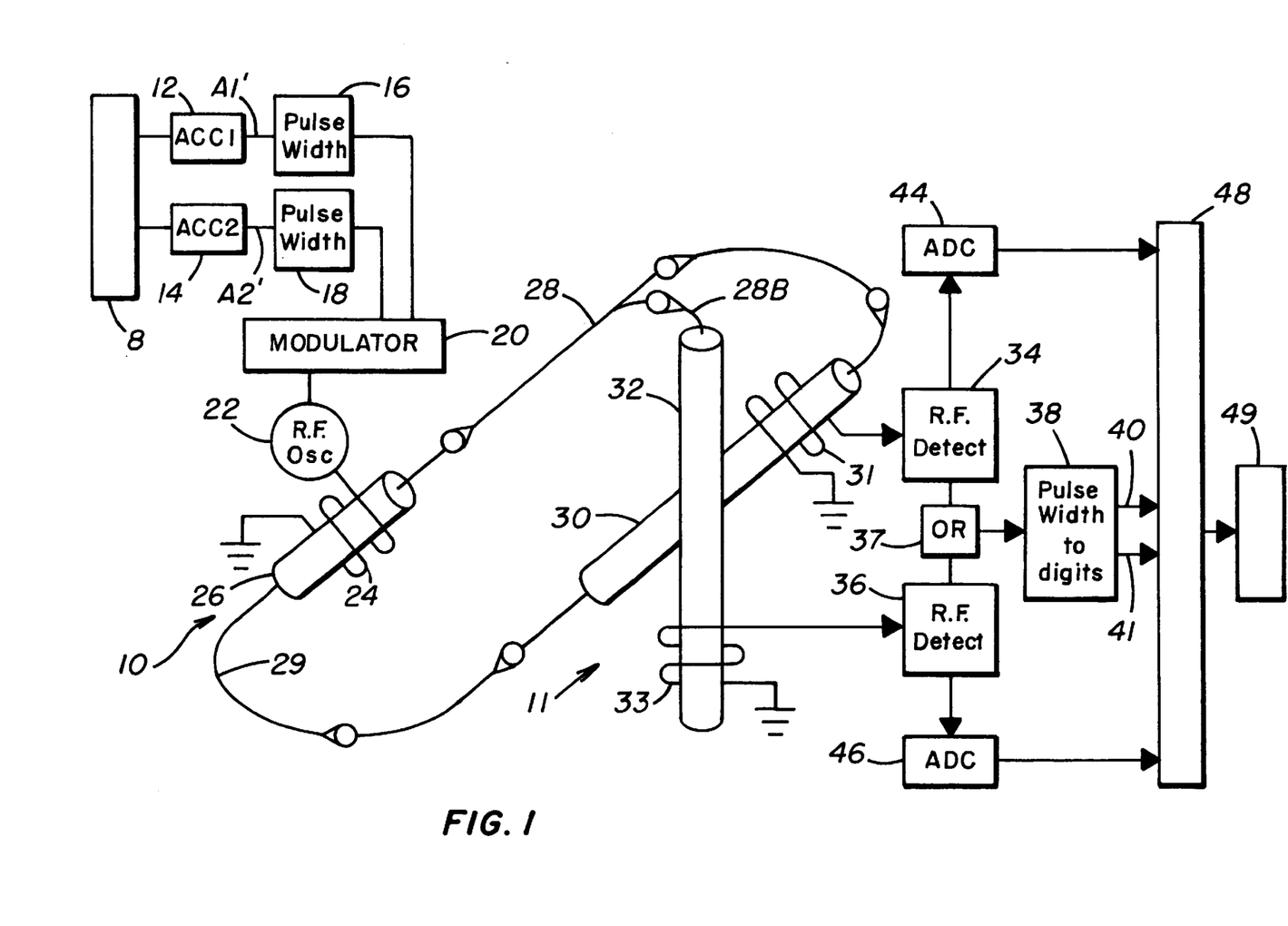
FIG. 1 is a block diagram of the present invention, utilizing the polarization feature of loop and rod antennas, and transducers and accelerometers.

FIG. 1 shows one preferred form of the body motion and angle detector system 10. The system senses acceleration of a remote body, uses polarized antennas to detect the angular position of the body, converts acceleration values to pulse width, and delivers acceleration values to a base station computer. FIG. 1 shows one version of the system, incorporating accelerometers and a polarized antenna configuration for determining the angular position of the remote transducers and accelerometers. Accelerometers 12 and 14, also identified as ACC1 and ACC2, are attached to a body 8, which may be a human body, and are mounted perpendicular to one another. Accelerometer 12 has an analog voltage output labeled A1', and is mounted horizontally on the human body 8. Accelerometer 14 has an analog voltage output labeled A2', and is mounted initially vertically on the body 8. The accelerometers 12 and 14 emit voltage signals proportional to the acceleration which they experience. In the Calculations, given later in Flow Chart FIG. 12, the accelerometer signals are identified as A1' and A2'.

The acceleration voltage A1' from accelerometer 12 is converted to a pulse width by pulse width Unit 16 and the voltage A2' from accelerometer 14 is converted by pulse width Unit 18. Pulse width modulation is one preferred form of modulation.

One basic principle employed in this invention is that radiating antenna 26 and receiving antennas 30 and 32 send and receive radio waves with a polarized quality. Polarization in this invention refers to the plane of the strongest part of the radiation. For example, as further shown in later figures, a transmitting rod antenna 26 couples best to a receiving rod antenna 30 when the two are in the same plane, or have identical angular position. Angular position is also referred to as tilt, for clarity of description, or angular tilt, and is also referred to as angular orientation, or simply orientation. The tilt of the polarization of the radiation is also the tilt of the radiating antenna 26.

The receiving antennas 30 and 32 receive the signal from antenna 26, via flux lines 28 and 29. The magnitude of the received signal varies according to the distance between antenna 26 and antennas 30 and 32, and also varies according to their relative tilt angles, as is brought out in later figures. The receiving antennas are dual, with the two antennas 30 and 32 perpendicular to one another, which produces two differing magnitudes of response. This dual information is used to compute the tilt, or angular orientation, of the transmitting antenna. The antennas may be loops, magnetic rods, or dipoles. The received signal strengths are used relative to one another to establish the operating angle, as explained later.

Elements 16 and 18 convert the analog values to pulse width. The conversion of analog value to pulse width is accomplished using a saw tooth. This form of modulation sends relative angle data independent of signal strength, and hence independent of distance of the transmitter from the receiver. The pulse width values enter modulator 20 which modulates radio frequency oscillator 22 The modulated R.F. signal is applied to windings 24 on ferrite rod 26. The rod 26 and windings 24 form a ferrite rod antenna suitable for radiating electromagnetic radio signals, described later in FIGS. 3, 4 ,5, 6, 7, 8, 9.

Flux lines 28 and return lines 29 are emitted by rod 26 as radio frequency signals and are received in rods 30 and 32. Rods 30 and 32 are part of the base station 11 and are typically fixed in position. In the initial or rest condition, also called the reference position, rod 26 is horizontal. Rod 30 is also horizontal, and rod 32 is at right angles, or orthogonal, to rod 30. The flux lines 28 and 29 follow their normal trajectory and are initially also in the same plane as rods 26 and 30. Flux lines will pass through rod 30. Rod 32, however, is perpendicular to rod 30, and no flux lines will pass through it. The flux lines for several equal or similar antennas are discussed further in FIGS. 3 through 9.

Figure 10:
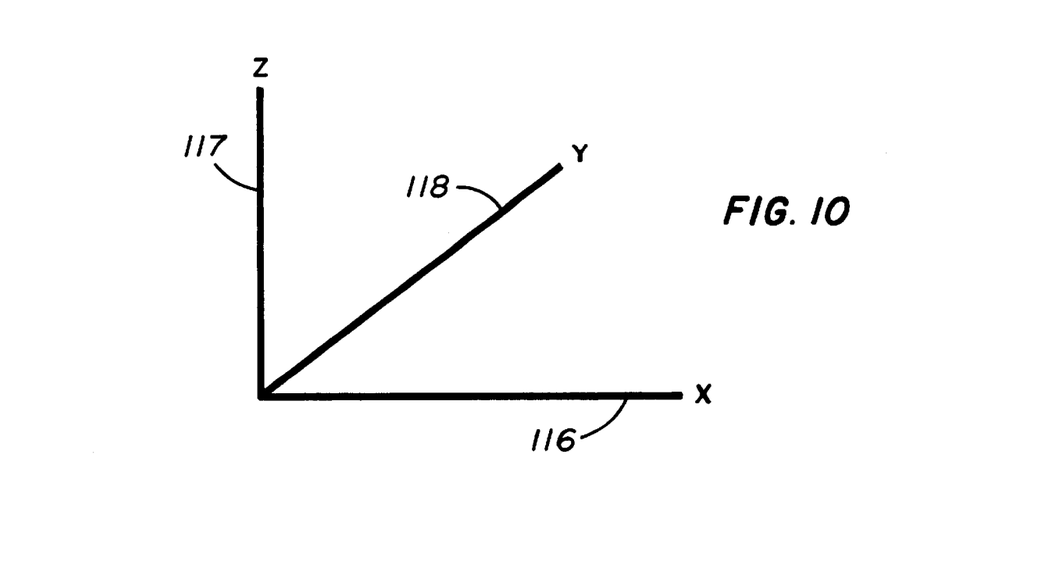
FIG. 10 is a graph showing Axes Identification in Three Dimensions
Figure 11:
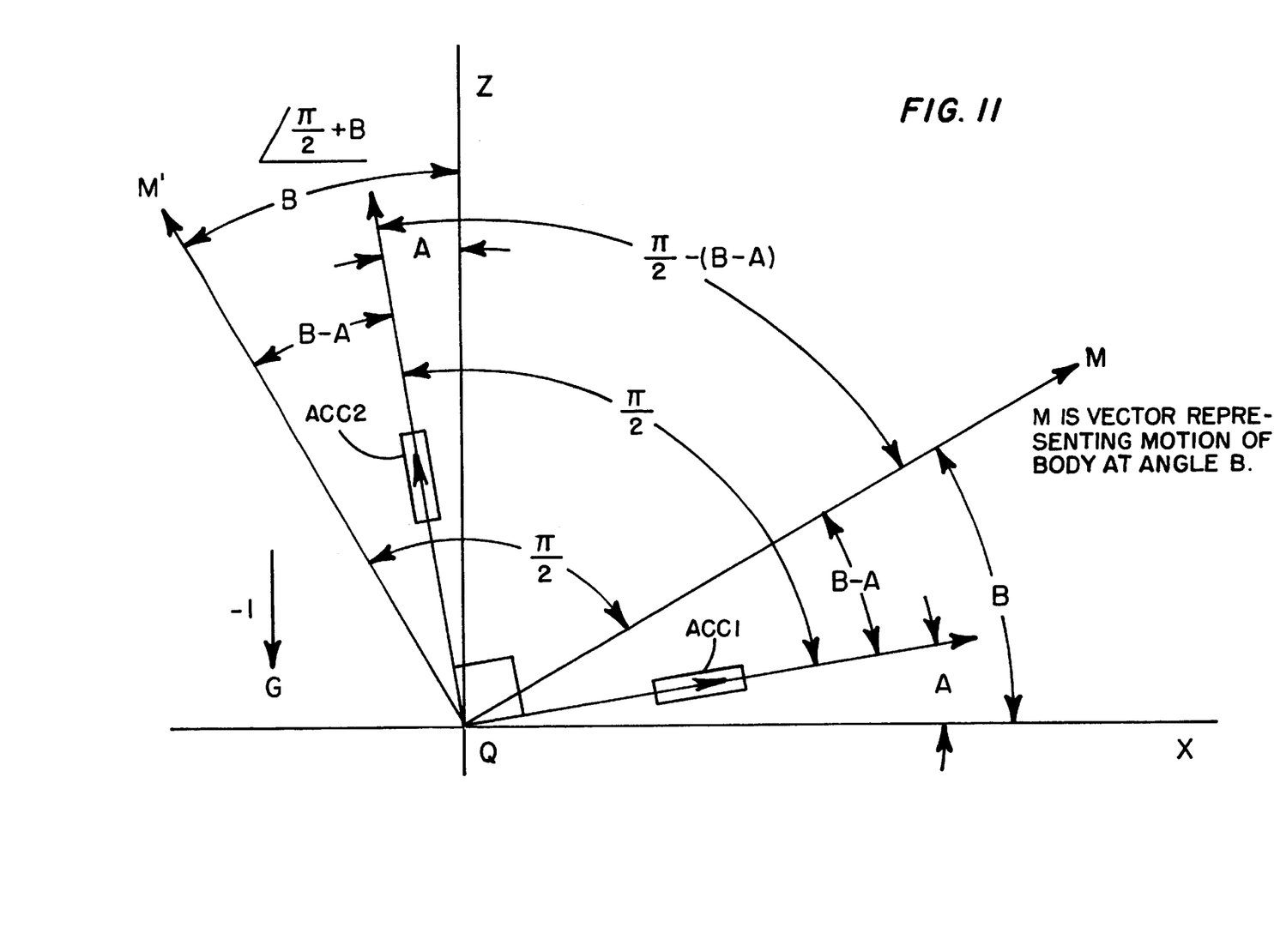
FIG. 11 shows the Transducer Angular Tilt and Transducer Acceleration Angle

Rod 26 is mounted to the body 8, and will, during normal exercise movements of the body 8 have a tilt angle A, where angle A is defined in more detail in FIG. 10. The tilt angle A is the departure of the body 8 from the initial horizontal rest position. When departing from horizontal, the coupling from rod 26 to rod 30 is reduced, and the output voltage of the windings 31 on rod 30 will become smaller. When rod 26 is at right angles to its initial position, the output on coil 31 will be zero. Further, as angle A increases, a portion of flux 28 and 29 will begin to flow through rod 32, and there will be a voltage output on winding 33. The output on winding 33 will grow to a maximum when rod 26 has moved through a full ninety degree angle A and is lined up in the same plane as rod 32. The magnitudes of the flux levels as angle A varies are shown in figure 11. The magnitudes represent the degree to which the rods are aligned or misaligned, also called tilt. The magnitudes follow the sine and cosine functions. To establish the polarity of the sine function developed in antenna 32, the phase angle of the carrier frequency is taken from loop 31 on rod antenna 30, and conversely from loop 33 on rod 32 when needed. A phase locked oscillator is used for the reference phase, and is not shown.

The radio frequency signal received by the rods 30 and 32 are amplified and amplitude detected in detectors 34 and 36 respectively. Their amplitudes are converted to digits in analog-to-digital converters ADC's 44 and 46 and sent to computer 42. The amplitudes of the two received signals are important for calculating the tilt angle of the body 8, as explained later in FIGS. 11 and 12.

The two detected signals are also fed to analog OR gate 37, which chooses as its output whichever of the two detected signals is stronger. The amplitude of the detected signal is unimportant for the next step, that of finding the pulse width modulation data. The data is characterized by a repeatedly transmitted pair of square waves, with pulse widths proportional to the acceleration values, and is known in the art. The pulse width modulated signals are converted to digital form by switching on and off counter 38. Not shown is the phase locked loop method locked into the data for separating the two accelerometer values from the single continuous carrier signal. This function is also known in the art, and is in fact used in radio control model airplane control. The acceleration values are input to the computer 48 and display 49.

Figure 2:
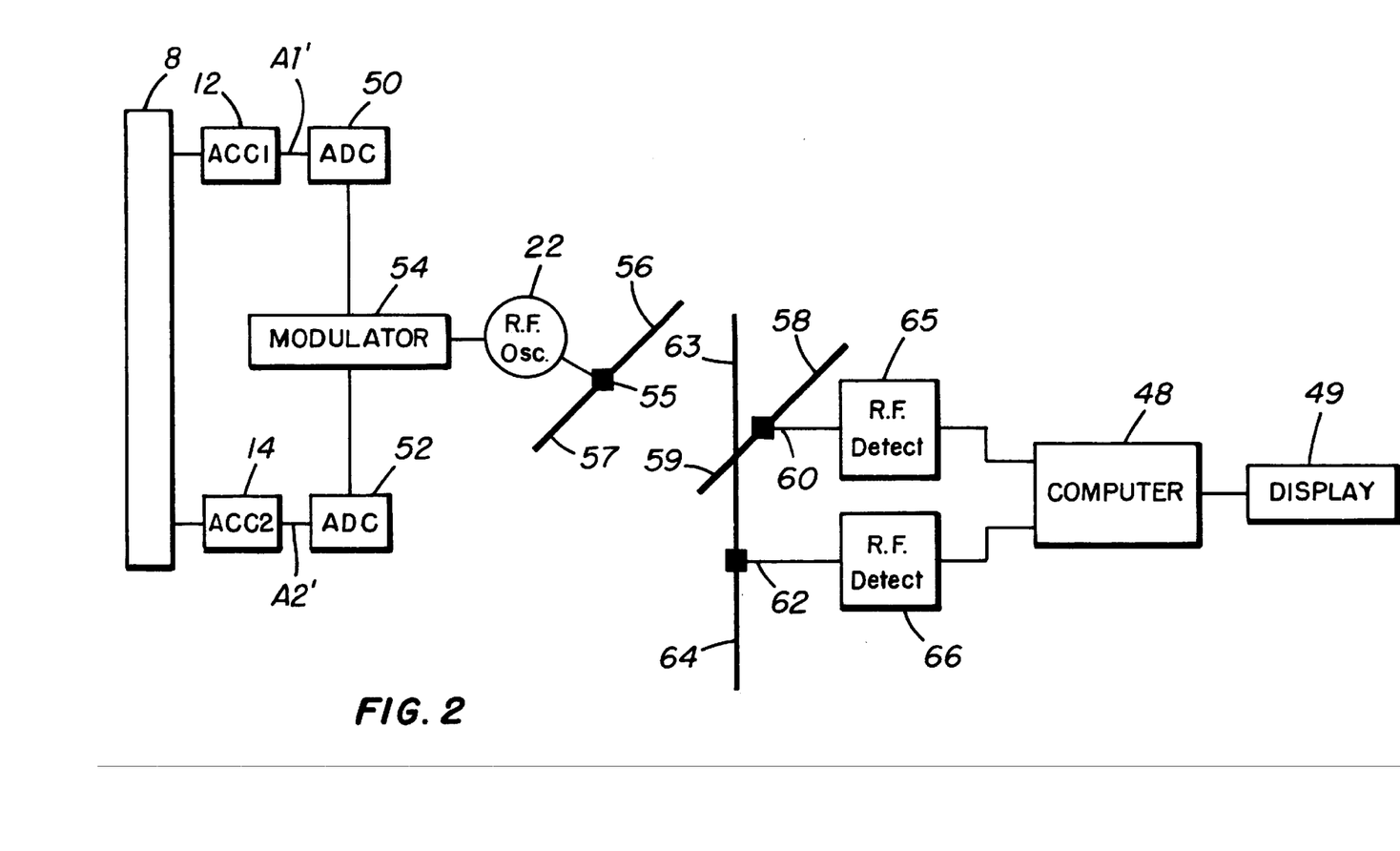
FIG. 2 is a block diagram of the present invention showing digital data transmission and dipole antennas.

FIG. 2 shows a variation of the system which accomplishes the same functions with several alternative means. Rather than converting the accelerometers 12 and 14 analog signals to a pulse width in the body 8 transmitting unit, the analog values are converted to digits immediately in analog to digital converters ADCs 50 and 52. These digital values go to modulator 54 to modulate R.F. oscillator 22. The values are transmitted by a dipole antenna. 55. Dipole antenna 55 is comprised of straight metal wires 56 and 58, driven in opposite phase by a phase splatter at the center. A single sided wire antenna will also communicate data but the electromagnetic fields are less regular and there is greater risk of error in the voltages used in the ensuing arctangent angle calculation.

For receiving the data there is a dipole antenna 60 formed of wires 58 and 59. A second dipole antenna 62 formed of wires 63 and 64 is mounted perpendicular to wire antenna 60. As with the aforesaid ferrite rod antennas, in-plane coupling is stronger than out of plane. As the tilt, or angular orientation, of antenna 55 rotates, away from horizontal, the signal level in 60 falls and the level in 62 rises. The advantage of this antenna variation is higher speed through use of higher frequencies, at the risk of more antenna field distortion from nearby objects owing to its working at higher impedance levels, and the risk of antenna pattern reflections from neighboring objects. The signals from antennas 60 and 62 are detected by detectors 65 and 66 respectively, and delivered to Computer 48 and Display system 49. The Computer 48 incorporates the OR 37 function.

Figure 3:
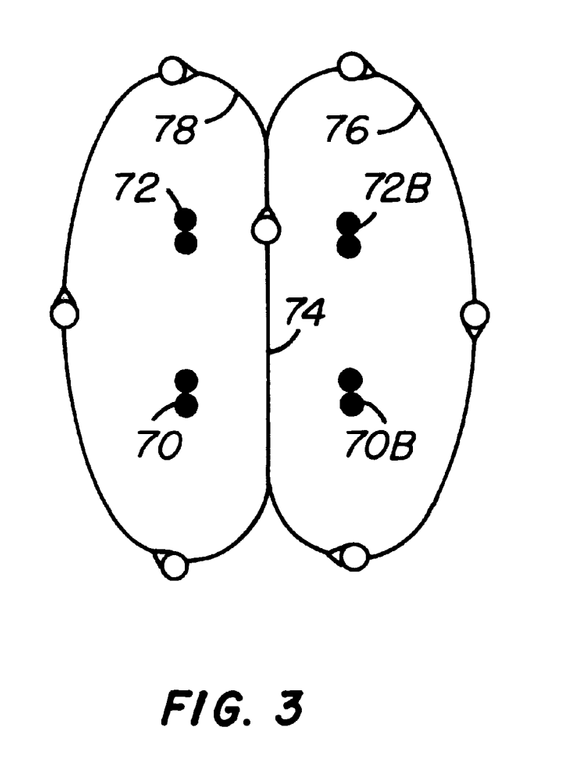
FIG. 3 shows In-line Loop Antenna Coupling, with Axial Flux Flow

FIG. 3 shows a basic antenna coupling configuration. There is a coil 70, also referred to as "turns 70", or "loop 70", or "antenna 70", for transmission, and coil 72 for reception. The element labeled 70B is the return part of the wire loop 70, and 72B is the return part of coil 72. The coils are shown in cross section, as just two large dots, with two turns, in a cylindrical or solenoid configuration. The coils are on the same vertical axis. The axis coincides with the flow of flux 74, defined later. The turns are shown on the same cylinder, one turn above the other, often referred to as a solenoid. The turns can also be in a planar, or pancake, configuration.

Voltage and current applied to coil 70 produces a flux 74 which splits into two parts, 76 and 78. Much of the flux couples with coil 72, with coil return element 72B, and coil 72 will have an output voltage. The flux returns on paths 76 and 78. These coils are the equivalent of the sending and receiving antennas of a radio system.

Figure 4:
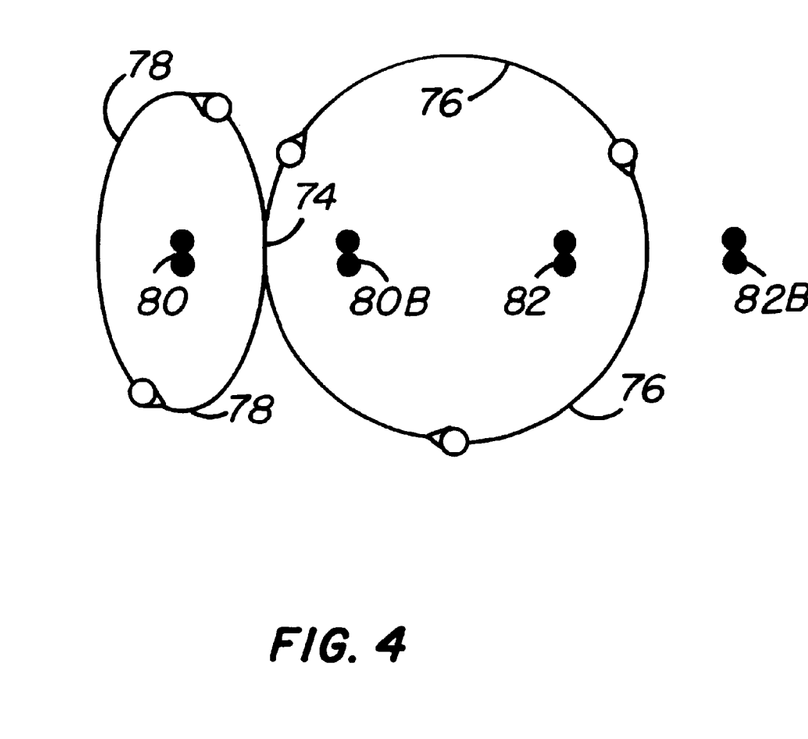
FIG. 4 shows Lateral Loop Antenna Coupling, with Lateral Flux Flow

FIG. 4 shows the coils 80 and 82, and these coils are built in the same manner as coils 70 and 72. In this example, however, rather than in line one above the other, the coils are in the same plane, and sideways to one another. The turns are also shown in the solenoid arrangement. A voltage on coil 80 causes a flux 74. Flux 74 returns by way of flux lines 76 and 78. This flux produces voltage in coil 82. This configuration functions well as an antenna but, for the same spacing, it acquires or couples 50% less flux, and is therefore 6 dB lower in response level. This configuration is referred to as lateral, or sideways, coupling.

Figure 5:
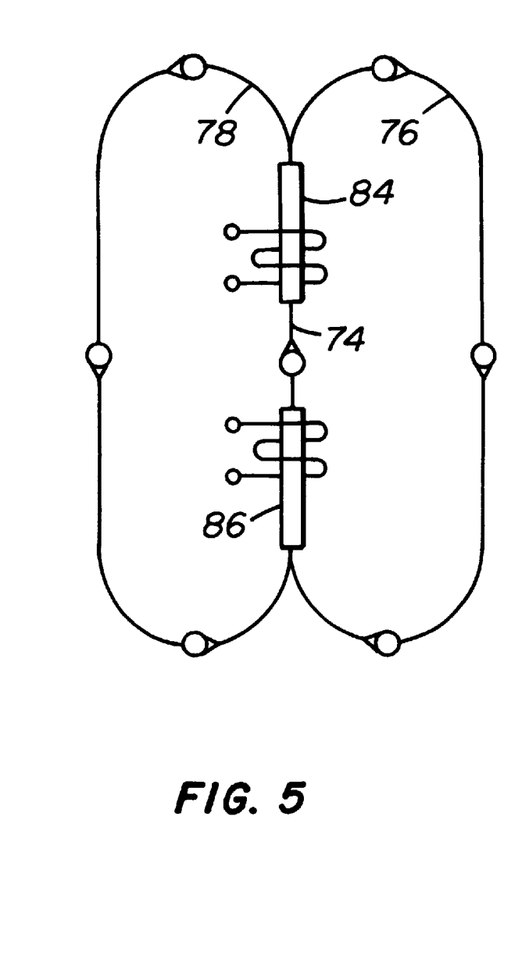
FIG. 5 shows In-line Rod Antenna coupling, with Axial Flux Flow
Figure 6:
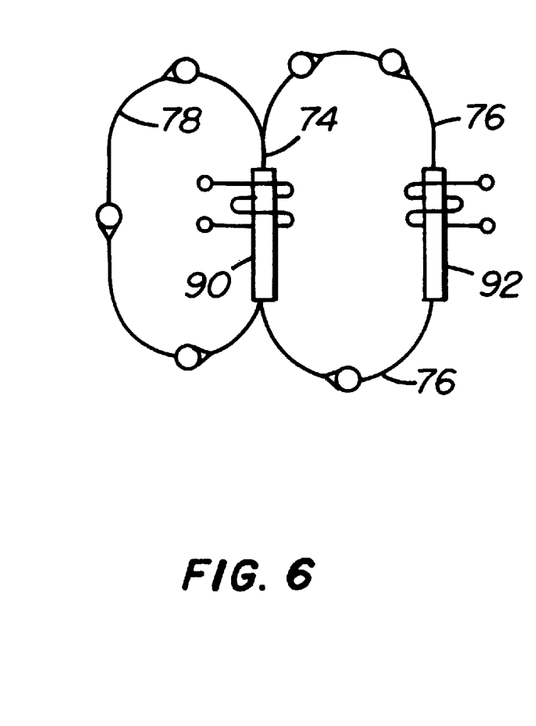
FIG. 6 shows Lateral Rod Antenna Coupling., with Lateral Flux Flow

FIGS. 5 and 6 show flux coupling using ferrite rods rather than loops. Rod antenna 84 consists of a ferrite rod with turns around it. Rod antennas 86 of FIG. 5, and rod antennas 90 and 92 of FIG. 6, are all made in this manner. Excitation of antenna 84 with voltage and current produces the flux 74 which passes through antenna 86. The electromagnetic action is equivalent to that which occurs between loop antenna 70 and 72 of FIG. 3. It differs in having two ferrite rods in line, on the same axis.

The ferrite rod concentrates flux, owing to its high permeability, and the antenna emits more flux, from the same basic area. The resulting advantage is reduced diameter and reduced space requirements. The disadvantage is the greater dimension in the axial direction, with a second disadvantage in that the ferrite does not perform as well at high frequencies. The disadvantage of axial dimension may or may not be a disadvantage, depending upon the configuration of the antenna worn by the user, or whatever moving object carries the transducers. As before, the primary flux lines are 74, which divide and produce flux lines 76 and 78, of which only 76 passes through the ferrite rod and rod antenna 92.

FIG. 6 shows side-by-side ferrite rods, 90 and 92, with flux lines similar to that of FIG. 4, namely initial flux 74, dividing into flux parts 76 and 78, of which 78 passes through rod 92. Coupling occurs but the efficiency of coupling is less than the on-axis coupling of FIG. 5. These basic interchangeable alternatives, namely solenoid shaped air windings, or rod windings, are applicable to all the configurations, including those shown in FIGS. 7 and 8.

Figure 7:
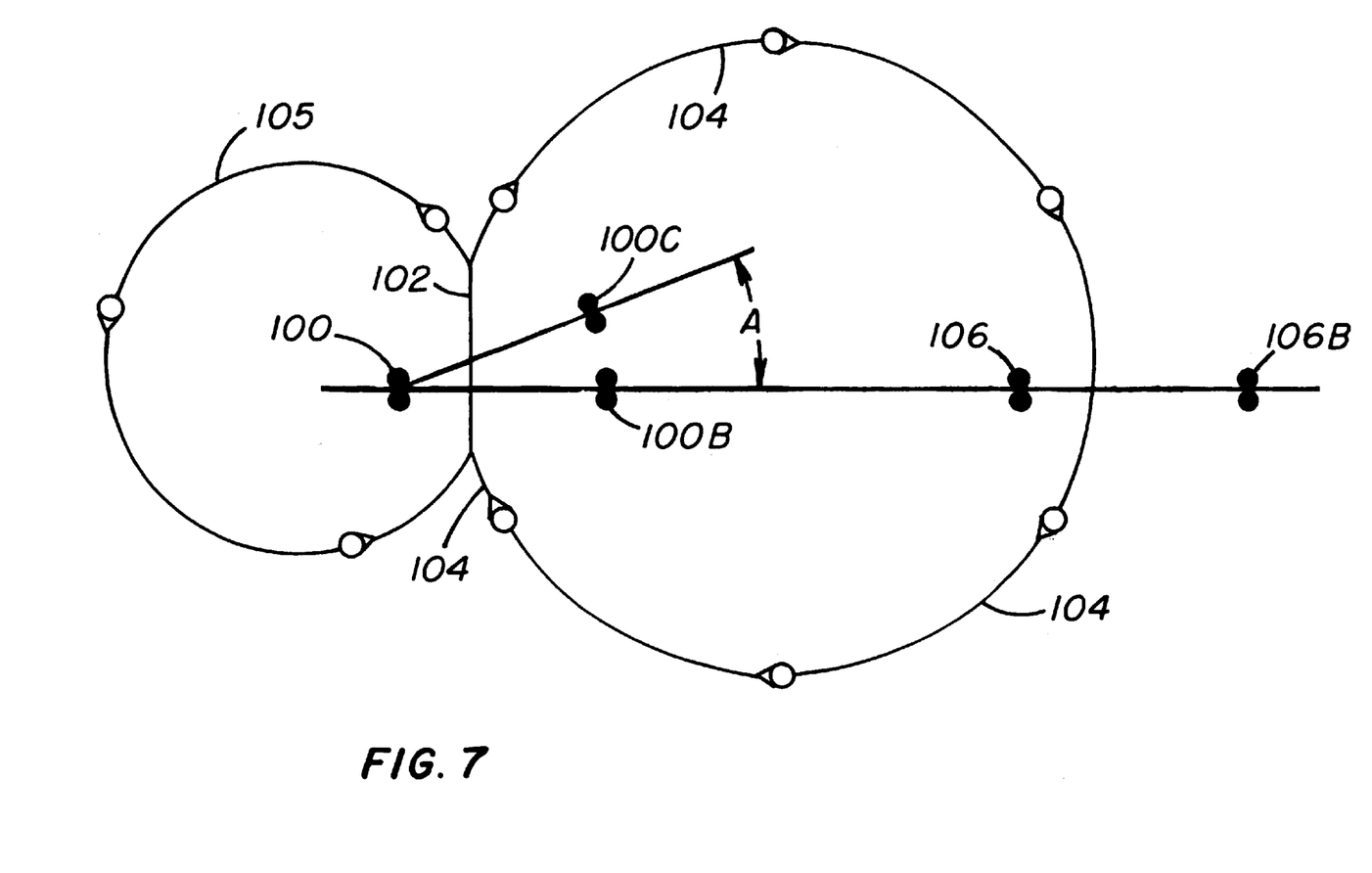
FIG. 7 shows Loop Antenna Rotation with Variable Degree Of Coupling to Orthogonal Loop Antennas

In FIG. 7 there is a loop antenna 100, with the return current portion defined as element 100B. There is a common flux line 102, which divides into flux lines 104 and 105. Flux line 104 couples energy to loop antenna 106, which has a return current path 106B. Now, when antenna 100 is caused to rotate through angle A to multiple positions, one of which positions is indicated by return windings 100C, the magnitude of flux 104 will vary with the angle A. As angle A grows the efficiency of coupling between coil 100 and coil 106, shown by flux line 104, becomes weaker, and flux line 105 becomes stronger. The energy coupled to coil 106 and/or the signal induced in coil 106 is reduced. When the angle A reaches 90 degrees, flux 104 drops to zero, the flux 102 is horizontal, and none of flux 102 passes through coil 106, but just passes sidewise. The output of coil 106 is labeled E106 and follows the cosine function 114 shown in FIG. 9.

Figure 8:
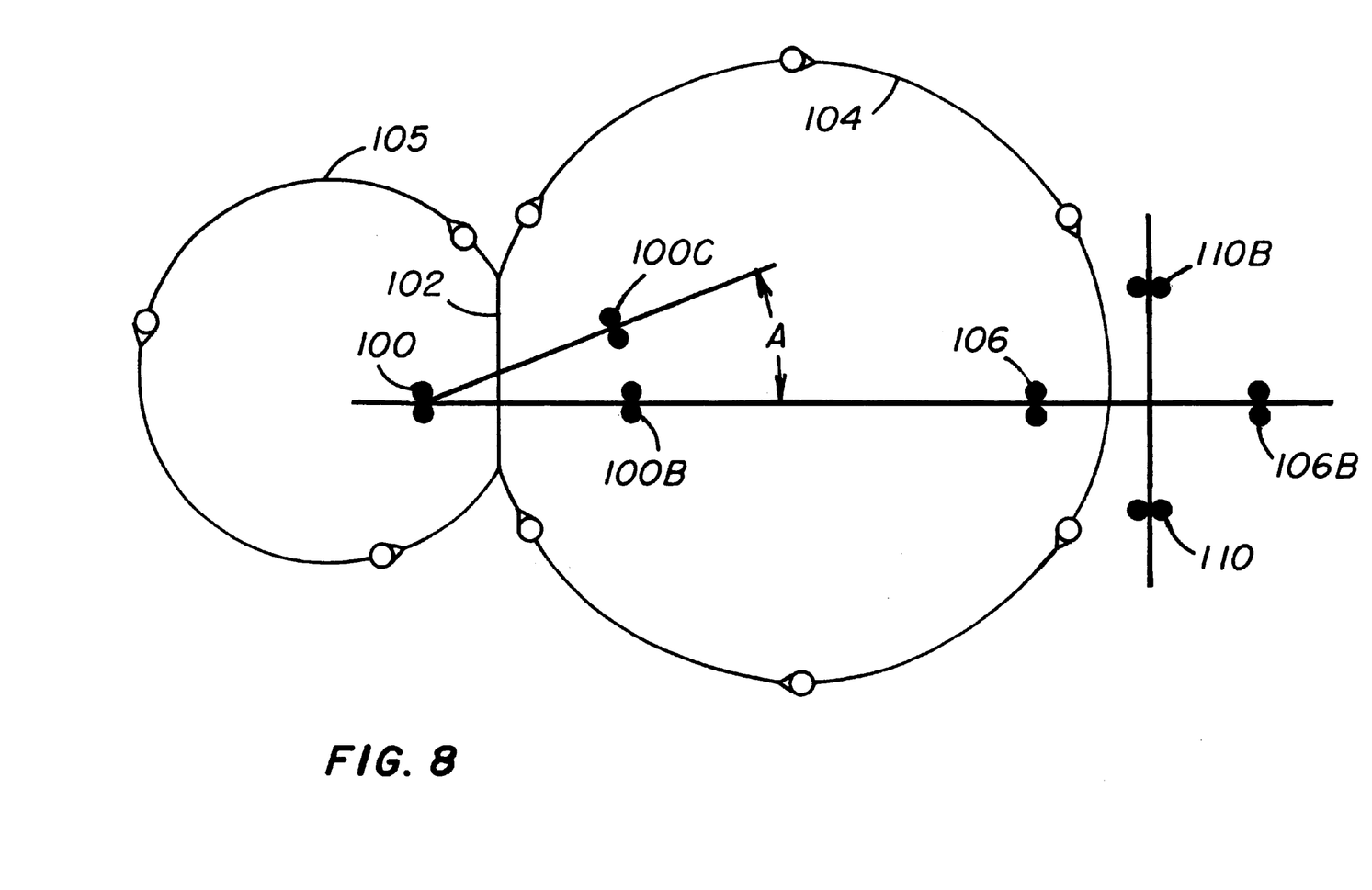
FIG. 8 shows Loop Antenna Rotation, with Orthogonal Dual Loop Receiving Antenna

Refer next to FIG. 8. Coil 106 is in the same plane as the initial position of coil 100, labeled 100 and 100B. Coil 110, with return wire 110B, is perpendicular to coil 106. The output of coil 106 is labeled 114 in FIG. 9, described later. As coil 100 moves to larger value of angle A, the coupling of coil 100, indicated by flux 102, to coil 106 diminishes, and reaches zero coupling at ninety degrees, or pi/2. Also, as the coil 100 moves to a larger angle, the coupling of flux 102 to coil 110 increases, and reaches a maximum at pi/2. The output of coil 110 is labeled 112 in FIG. 9.

When coil 100 reaches the ninety degree, or pi/2 position, coils 100 and 110 are on the same axis, with an alignment equal to that shown in FIG. 3. The efficiency of coupling and the output voltage is a maximum. The plot follows the sine law and is depicted as curve 112 in FIG. 9.

Figure 9:
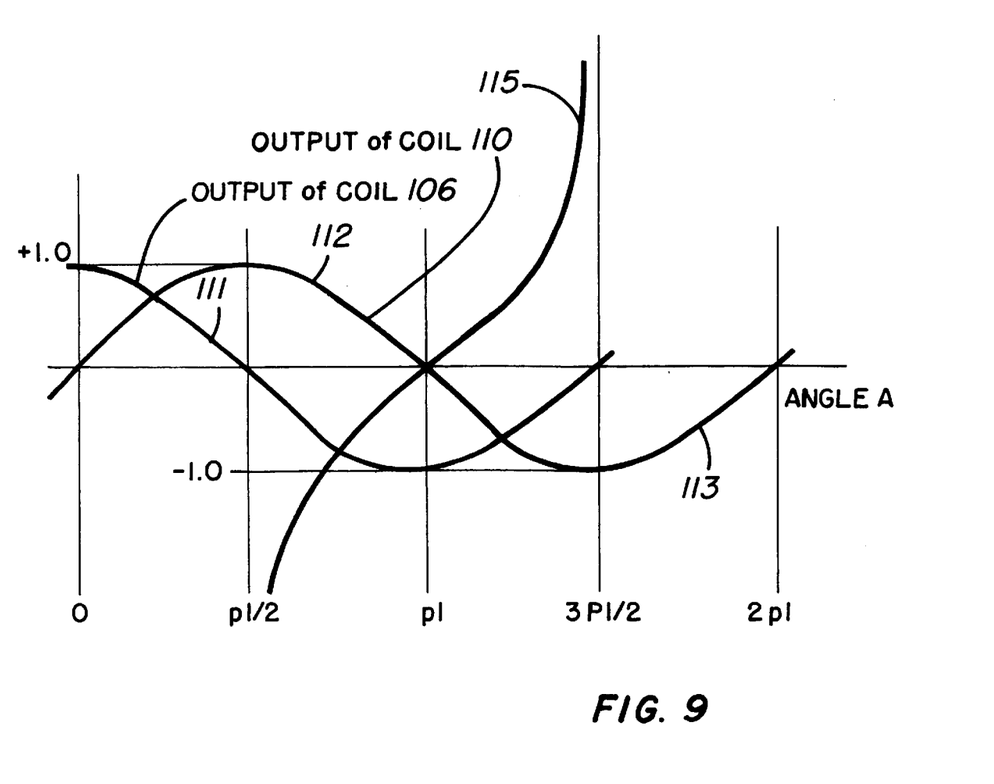
FIG. 9 is a graph showing Received Signal Variations versus Angle of Transmitting Antenna

In FIG. 9 the output voltages of coils 106 and 110 are plotted. The output voltage of coil 106 is designated curve 111 in FIG. 9, and the output voltage of coil 110 is designated curve 112. In practice, the maximum values are trimmed to be equal, by either changing the preamplification value, or the number of turns, or by a computer multiplication step. This equalizing of the peaks is done to allow rational division of the two values and get the tangent of the tilt angle, as described in FIG. 12.

The output voltages of receiving coils 106 and 110 are also referred to as readings. These readings are quantified using analog to digital converters, in a conventional manner, not shown, and the readings are therefore in form suitable for entry to the computer, in a conventional manner, not shown.

It needs to be understood that another factor affecting the size of the received voltages is the distance of the transmitter, or body 8, from the receiver 11. The distance variation applies equally to both rods 30 and 32.

The amplitudes 112 and 114, from R.F. detectors 34 and 40 in FIG. 1, or R.F. detectors 64 and 66 as in FIG. 2, are fed through analog to digital converters, not shown, into the computer 42 or 43. The two values are divided. The amplitudes caused by, or attributable to, the distance effect cancel out. From the equation: sine divided by cosine equals tangent, we get the tangent value, and from this the angle A is calculated. The result is a value for the angle A of the transducer body 8, independent of the distance from the body 8 to the receiving antennas 30 and 32. The same applies for the reception of antennas 60 and 62 in FIG. 2.

Figure 12:
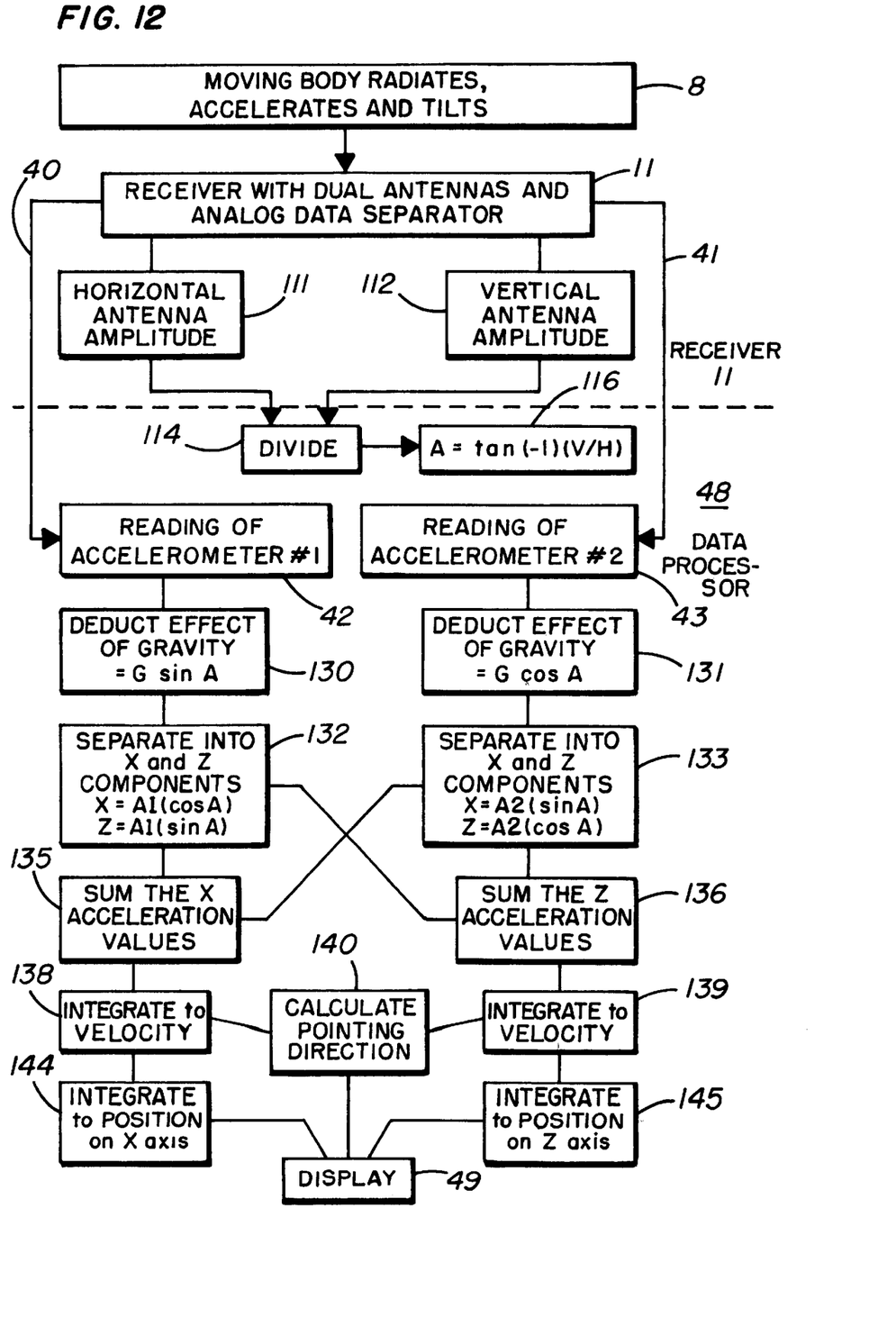
FIG. 12 shows the Programming Flow Chart, from Accelerometer Data through to Display

In other words, for determining transmitter angular orientation or tilt, a loop antenna, for example, on the transmitter radiates a distinctively shaped flux field. A receiving loop antenna in the same plane will receive maximum signal or flux; whereas a receiving loop in a ninety degree plane receives no signal or flux. If the receiver has two orthogonal receiving loops, the two loops will provide complementary data. The relative signal strength received by the two will vary as the sending loop rotates. The amplitude variations with angle of one is sinusoidal and for its associated orthogonal loop the variation is co-sinusoidal. Dividing the sine and cosine values received by the two antennas yields a value equal to the tangent of the angle, and independent of the distance of the receiver from the sending antenna. Thus we know the angle of the transmitting antenna, even though the distance between device and receiver varies. From the angle we may compensate for the effects and errors due to gravity in the remote accelerometers, yet still measure accurately the acceleration behavior of the mobile device. FIGS. 11 and 12 further illustrate these points.

FIG. 10 shows the definition of the coordinates used in the following analysis. Horizontal motion is defined as X axis 116 motion. Vertical motion is defined as Z axis 117 motion. The third mutually perpendicular axis is Y axis 118 and points from the body 8 horizontally to the receiving station 11.

There are three other possible coordinate configurations between the moving body 8 and the base station 11. These are given in Table 1 below.

TABLE 1

SPATIAL COORDINATES

| PLANE | AXIS |
|---|---|
| XZ | Y |
| XY | Z |
| YZ | X |

For this application, just one of these coordinates systems, the first, is used in the analysis which follows. The work can be extended to all three axes. A future patent application will describe multiple axis capability.

A typical application is to have two accelerometers mounted on the torso of a human body. Accelerometer 12, also labeled ACC1, is mounted horizontally on a wearer's belt, and thus is initially horizontal. Horizontal is defined as the X axis 116. Accelerometer 14, also labeled as ACC2, is mounted perpendicular to most belt motions, and is thus initially vertical. Vertical is defined as the Z axis 117. The third axis is the Y axis 118, about which the system rotates. The receiver antennas couple best in the Y direction.

FIG. 11 is a vector diagram representing the trigonometric relationships in the system. Accelerometers 12 and 14 are mounted perpendicular to one another, and are attached to the body 8. The body 8 will tilt in either direction during exercise. The tilt angle is A. Angle A represents the amount by which the body has rotated about the Y axis.

The mathematical analysis of the forces on the body 8, the accelerometers 12 and 14, and the useful results for plotting the vertical and horizontal display on screen 42 are given in the programming flow chart of FIG. 12.

The body 8 has an acceleration in the X and Z plane as well as rotation in the same plane. The acceleration is depicted as a vector of magnitude M and direction angle B. The body 8 together with accelerometers 12 and 14 are also subject to the action of gravity. Gravity is defined by the vector 122, and has a magnitude of minus one G at an angle −90 degrees. "90 degrees" is also referred to and defined as "pi/2". The body 8 and the two accelerometers 12 and 14 totally move together, with the same tilt and same acceleration vector.

FIG. 12 is the computational flow chart, and displays the program calculations needed to obtain the desired result. As shown in FIG. 1, the moving body 8 bears two accelerometers 12 and 14 and a radio transmitter with an R.F. oscillator 22 which radiates from its antenna 26 to two receiving antennas 30 and 32, both contained in receiver 11. The data values entering the computer from receiver 11 are, first, the two values of signal amplitude strength, from antenna 106 which appear in box 111, and from antenna 110 appearing in box 112. Further, from pulse width modulation and demodulation shown in FIGS. 1, 13, and 14, there are two acceleration values from the Pulse Width to Digits Converter 38. Thus four items of information emerge from the radio receiver 11 and are sent to the computer/display system 42.

Signal strength 111 from horizontal coil 106 varies as the cosine of the tilt angle A, and signal strength 112 from vertical coil 110 varies as the sine of the tilt angle A. The strength 112 from vertical coil 110 is zero when angle A equals zero.

The signal strength of both 106 and 110 varies also as the distance between the sending and receiving antennas, and this distance variation factor is common to both of the receiving antennas 106 and 110. The distance factor is termed the "distance coefficient" also referred to as simply DF. In the calculation program, the two values of amplitude signal strength are divided, that is, the strength from loop 110, defined as 112 in FIG. 12, is divided by the amplitude strength from the loop 106, defined as 111 in FIG. 12.

Signal strength 112 is DF sin A. Signal strength 111 is DF cos A. 112/111=DF sin A/DF cos A which equals tan A.

The overall distance coefficient is divided out in the step labeled 114.

The division of programming step 114 divides a sine varying value by a cosine varying value. Sine divided by cosine is the tangent. This division gives a value of the tangent of angle A, and hence the value of angle A, and is the output of programming step box 116.

This calculated angular orientation value of the body 8 is independent of the distance of the receiving coils from the transmitting coil and establishes the angular orientation of the transmitting body, and is important for the ensuing correction of effects on the accelerometers from gravity and from motion in space.

Accelerometer values are affected by the force of gravity 122, also designated G. Gravity in this situation is an undesired component of the reading, and constitutes a form of "noise." In order to study just motion 120, the gravity effect 122 is subtracted. Gravity 122 is a fixed constant component, to be subtracted. The effect of gravity on the individual accelerometers changes when the tilt angle changes, as is discussed in the next paragraph.

The error in the accelerometer 12 reading due to gravity is: −G sin A. To confirm this statement, note that when the accelerometer 12 is level, that is, angle A=zero, there is no effect from gravity. As the angle, increases, gravity exerts a greater and greater influence, and if the angle becomes ninety degrees, also defined as pi/2, then the full effect of gravity is felt by the accelerometer. The value of −G sin A is subtracted from the accelerometer 12 reading.

The other two values received by receiver 11 are the two accelerometer values, from accelerometer 12 labeled value 40, also designated A1'; and the value from accelerometer 14 labeled 41, also designated A2'. Accelerometer values are affected by the acceleration movement vector 120, also designated M, of body 8, and by gravity 122. The reading 40 from accelerometer 12 is A1' and is held in program box 42. The value 40 or A1' is corrected for gravity and is termed A1. Therefore, A1=A1'−G sin A. The value is held in box 130.

The reading 41 from accelerometer 14 is A2' and is held in program box 43. The accelerometer 14 is primarily vertical. Gravity 122 exerts full influence when the rest position is vertical, and the effect diminishes as the angle A increases. The corrected value for the acceleration is termed A2. Therefore, A2=A2'−G cos A. The value appears in box 131. In FIG. 12, the correction for gravity is made in blocks 130 and 131 and held here for the brief duration of each calculation iteration.

It is assumed for the remainder of these calculations that the gravity 122 correction terms shown in program boxes 130 and 131 have been applied. A1 and A2 henceforth represent the corrected value of the accelerometer readings.

The next step calculates the X and Z acceleration values of the body 8, from the corrected accelerometer readings A1 and A2, even though the pair of accelerometers is tilted from horizontal by the angle A. Movement represented by vector 120 is projected onto the axis of accelerometer 12. The angle between the vector 120 and accelerometer 12 is B−A. The projection is proportional to the cosine of the angle B−A. (This can be verified by assuming for a moment that B−A is zero. Then the projection would be direct and complete, or unity, in accordance with the cosine function.)

The output reading A1 of accelerometer 12 is:

$$A1 = M \cos(B-A). \qquad \text{equ. 1}$$

In other words, the output of accelerometer 12 is proportional to the acceleration of body 8, but is diminished to the extent the tilt angle of body 8 differs from the vector direction of the applied acceleration angle.

Accelerometer 14 is perpendicular to accelerometer 12. The projection of vector 120 onto accelerometer 14 is proportional to the sine of the angle B−A. (To check, assume B−A is zero. The motion 120 is then at right angles to the pointing direction of accelerometer 14. There would be zero output. This value is in accordance with the sine function.)

The output reading of A2 of accelerometer 14 is, therefore:

$$A2 = M \sin(B-A). \qquad \text{equ. 2}$$

The objective, restated, is to calculate the value of acceleration of body 8 in the X and Z directions, suitable for display on the X and Z axes of the display screen 49 on computer unit 48. The X axis is sideways on both the screen and for the body 8 movement. The Z axis of the screen is vertical, and is equivalent to the Z axis of the accelerometer movement. FIG. 10 defines these axes.

For the total acceleration in the X direction of body 8, we sum the appropriate portions of the values from the two accelerometers. The accelerometer readings are projected onto the X axis.

The X component from accelerometer 12 is: $X1 = (A1) \cos A$. equ. 3

The X component from accelerometer 14 is $X2 = -(A2) \sin A$. equ. 4

The X total is: $X1+X2 = (A1) \cos A - (A2) \sin A = X$ equ. 5

Similarly, the acceleration components in the Z direction are:

Z component from accelerometer 12 is $Z1 = A1 \sin A$, equ. 6 and $Z2 = A2 \cos A$ equ. 7

Z total is: $A1 \sin A + A2 \cos A = Z$ equ. 8

The separation into X and Z components is accomplished in blocks 132 and 133. The several X and Z components are summed in blocks 135 and 136.

Substitute the values for A1 and A2 obtained from equation 1 and equation 2, into equations 5 and 8:

$$X = M \cos(B-A) \cos A - M \sin(B-A) \sin A, \text{ and} \qquad \text{equ. 9}$$

$$Z = M \cos(B-A) \sin A + M \sin(B-A) \cos A. \qquad \text{equ. 10}$$

Let D=B−A, and B=D+A.

We know from trigonometry that $\cos D \cos A - \sin D \sin A = \cos(D+A)$. equ. 11

Therefore, $X = M \cos(D+A) = M \cos B$. equ. 12.

Similarly, again using D=B−A, and $\cos D \sin A + \sin D \cos A = \sin(D+A)$, equ. 12

$Z = M \sin(D+A) = M \sin B$. equ. 13.

We have, therefore, the desired and corrected X and Z acceleration values, describing the motion of body 8. We have the description of the motion in the X and Z plane.

The error due to the presence of tilt A is completely eliminated. The Body 8 can tilt and gyrate yet we still display the correct values for the overall motion, also called translation, of body 8. The error from gravity has also been eliminated.

The remaining program blocks convert the acceleration readings into a display on the display screen 49.

The first integration step, in blocks 138 and 139, is to obtain velocities in the X and Z directions. The X and Z velocity values are first used to calculate a pointing direction, in block 140, and thus gain display reality when applied to a simulated graphics automobile or equivalent, on the display screen 49. In other words, an object on the display screen 49 representing, for example an automobile or human body, should point in the direction in which it moves across the screen 49.

The X and Z velocity values are also used in the second step of integration, to obtain position, which is accomplished in blocks 144 and 145. These integration steps are described more fully in referenced U.S. Pat. No. 5,989,157.

The X and Z values together control a position on the screen 49. Errors from gravity and tilt have been eliminated. The movement of the body 8 is thus expressed in ground based values.

PULSE WIDTH MODULATION

Figure 13:
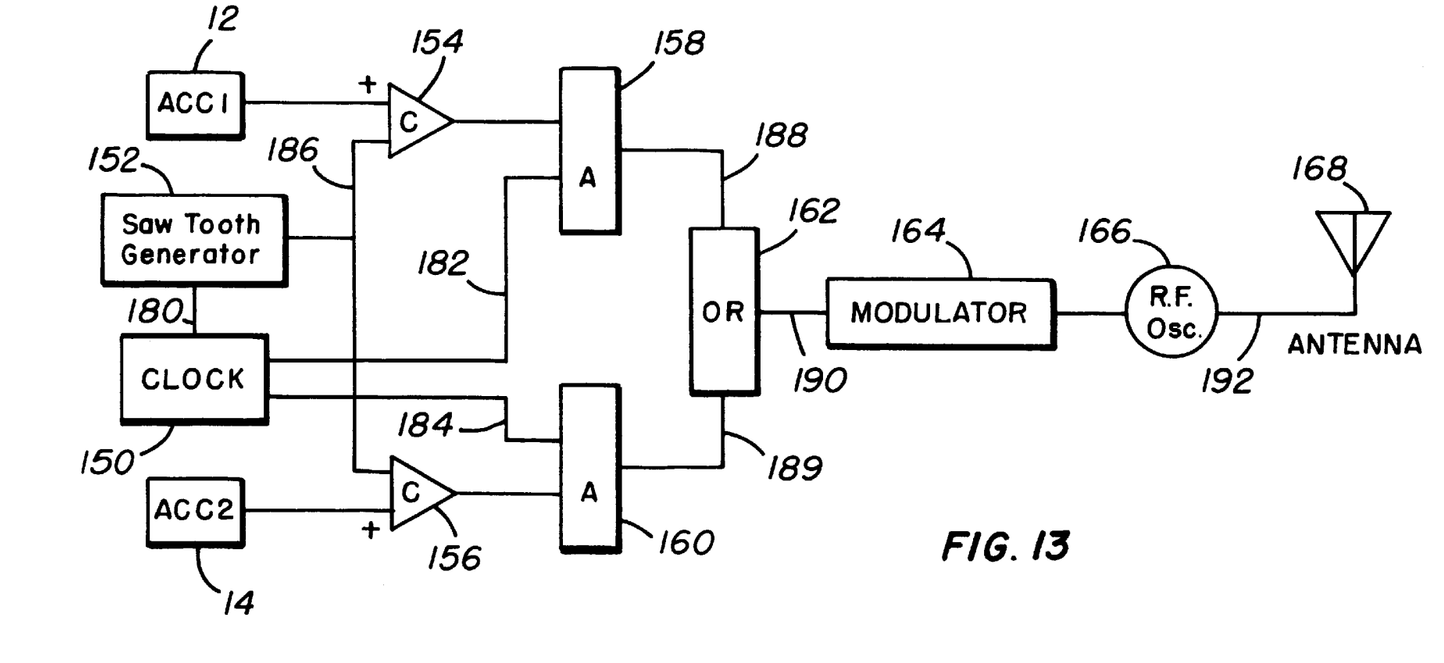
FIG. 13 shows the system for Transmitting Analog Data Using Pulse Width Modulation
Figure 14:
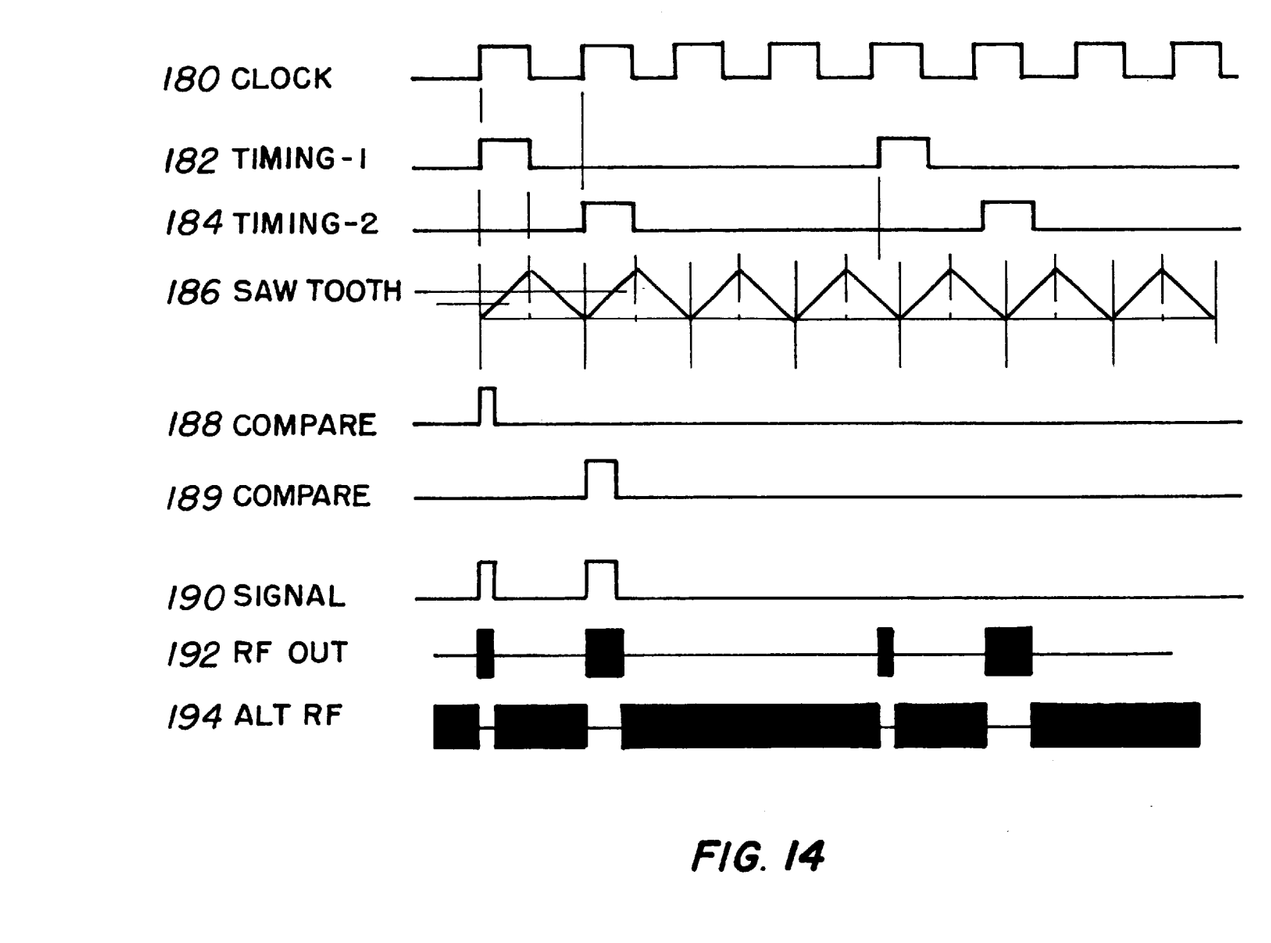
FIG. 14 shows the Timing Diagrams for Analog to Pulse Width Modulation

FIG. 13 shows the specifics of the pulse width modulation system. FIG. 14 shows the associated wave shapes. There are analog voltage inputs from accelerometer 12 and accelerometer 14. A clock 150 generates repeated square wave timing commands, shown as line 180 in FIG. 14. There is an overall cycle of four square waves for each group, also referred to as a set, of analog readings. The clock 150 further subdivides its signal to generate the two selected waves 182 and 184, denoted in both FIG. 13 and FIG. 14, and said selected waves 182 and 184 peak at two different times associated with the two analog readings.

The clock 150 commands saw tooth wave generator 152 to produce a saw tooth wave 186 with each square wave. The saw tooth wave 186 passes through all values from zero to its maximum value (typically five volts). The saw tooth voltage 186 values are compared against the analog input values in comparators 154 and 156. The output of comparator 154 is "true" or positive when the signal from accelerometer 12 is greater than saw tooth voltage 186, and negative (or down, or ground) when wave 186 is greater than accelerometer 12. Thus the output of comparator 154 will be positive for a time proportional to the size of the signal from accelerometer 12. The output of comparator 154 is sent on to half select And gate 158.

Similarly, the output voltage of accelerometer 14 is compared against saw tooth wave 186 in comparator 156. The output of comparator 156 is "true" for a time duration proportional to the size of the output of comparator 156. The output is sent to half select And gate 160.

The comparator outputs are logic levels which half select the first halves of And gates 158 and 160. The clock 150 emits waves 182 and 184 which alternatingly half select the second halves of And gates and 158 and 160. Thus first the pulse width signal 188 representing accelerometer 12 is passed, and then the signal 189 representing the output of accelerometer 14 is passed. The outputs of 158 and 160 are merged in OR block 162. The overall result is a repeated wave 190 in which the first pulse represents the reading of accelerometer 12, and the second pulse represents the reading of accelerometer 14.

Wave 190 goes to modulator 164 which modulates oscillator 166, for a final signal to the antenna 168. The radio frequency output is represented by wave shape 192.

A simple alternative is to take the inverse of wave 192 and let RF transmission occur continuously except for breaks whose width represent the two analog values, also referred to as accelerometer readings, as shown by wave 194. The advantage of the inverse modulation configuration of 194 is more consistently available amplitude data for the receiver, but at the cost of greater current drain.

Not shown is the complementary system within the receiver to convert pulse widths back to analog levels (analog levels are also referred to as accelerometer readings.) The receiver system uses a phase locked oscillator to lock onto the repeated transmissions from the modulator system of FIG. 13. The analog values feed an analog to digital converter for entry to the computer. Alternatively, the pulse widths are used to gate control entry to a digital counter, and consequently accumulate digital values proportional to the accelerometer values. The digital counter value is transferred into the computer.

EXTENSIONS

Plane of rotation: The aforesaid describes the system behavior in terms of angular rotation of the ZX plane around the Y axis. The system is extendible to all three degrees of rotation by additional similar antennas and calculations. The typical minimum requirement is one transmitting antenna in the desired plane, and two orthogonal receiving antennas. Differing transmitting frequencies are used to avoid interaction between the various receiving antennas. The result is a report to the base station of the orientation of the remote body and its transducers Effects of gravity are canceled by calculation, and other effects can be allowed for, such as changing wind pressure, affects of tilt and orientation on pressure and temperature readings, etc.

Rotating receive antenna: Rather than two receiving antennas, a single receive antenna is made to rotate continuously through all possible receive angles. Thus, dual orthogonal receive antennas are not needed, but rather the signal strength at each angular postion is recorded, especially the ninety degree values. The economic advantage of a single antenna is offset economically against the need to rotate and to track the rotation.

Multiple base antennas and location determination: Antennas at the base station may be made multiple and be separated from several units of size. There is then allowed a parallax calculation of the location of the transmitting body (also referred to as the remote body), in three dimensions. Thus all six degrees of freedom (three tilt, also referred to as angular orientation, and three location) of the remote body are known to the base station. The opportunities for game and exercise stimulation are greatly increased. This opportunity is achieved with only one or two small devices attached to the body. Competing systems have required buttons or reflectors to be placed on the moving body (see paragraph in the Background describing means to identify motion without accelerometers), and viewed in the line of sight, and/or required sophisticated and error prone programs for analyzing body position.

Differing frequencies: For differing antenna combinations, or when dealing with multiple moving bodies, added antennas are needed for full description or orientation and location. To avoid interaction, differing frequencies are used. Harmonically related frequencies are, of course, avoided. There are numerous frequency options, but it is generally easier to work at frequencies where the quarter wavelength is greater than the distance between the moving object and the base station. For an exercise system, typical distances are 3 to 6 meters, for frequencies in the range of 10 MHz or lower. One likely available frequency is 13.56 MHz, the Industrial/Medical/Scientific IMS band.

Identifying motion without accelerometers: Programming from a video picture will also provide for detection of motion. Colored gloves help. The picture can be programmed to seek a certain color and translate this introductory action to the screen. Smarter programming does not need color. Using an accelerometer, however, and other transducers, continues to have the advantages of accuracy and reliability, redundancy, and more simple programming.

Carrier phase determination: In the third and fourth quadrants, the polarity of the vertical antenna rod changes. It is necessary to preserve the polarity. Three methods follow but are not described in detail.

1. Phase locked loop carrier memory within the receiver. At the start, the transmitter is nominally at the horizontal or reference angle, and a phase locked oscillator is started. The phase is remembered even in the extreme positions where the accelerometers are turned upside down.
2. A burst of extra high frequency is made to occur in the synchronization time of the primary data carrier. This high frequency preserves the carrier phase.
3. Low frequency carrier, which passes through zero at the required synch time of the primary (data bearing) oscillator.

Determining Source Orientation and also Direction to the Source:

In advanced situations it is desirable to know not only the orientation of the remote device, but also the direction to the source device from the base station. This knowledge can be acquired if both the sending antennas and the receiving antennas are built with orthogonal pairs of antennas. This need can arise, for example, if a space ship, or boat, or a robot, are being commanded to dock at a docking port, and their propulsion systems must be ordered to both bring the vessel to port and to orient the vessel, parallel or head-in or otherwise to the docking port or station. Other examples where remote detection of angular positon is important are: valves or robots within the human body, or underwater valves.

What I claim is:

1. A method for detecting motion of a body by wireless means, comprising a radio transmitter and antenna mounted on said body, accelerometers mounted on said body, a base station bearing a receiver and multiple receive antennas, said receive antennas having a least two polarized antennas placed orthogonal to one another, measuring of signal strength received by said polarized antennas, a computer calculating from said received signal strengths the angular position of said transmitter antenna, said accelerometers reporting body acceleration in multiple directions, said computer also calculating the correction to the accelerometers readings for gravity error produced by said angular position, and further computing converting accelerometer readings to true X and Z accelerations, and displaying of the resulting motions.

2. A method for detecting motion of a body as in claim 1 in which there are multiple transmitting antennas, and multiple receive antennas placed at multiple angles with respect to the base station, measuring the signal strength of said receive antennas, and calculating multiple angular position angles.

3. A method for detecting motion of a body as in claim 1 in which the motion is that of a human body participating in playing an electronic game and simultaneously undertaking exercise.

4. A method for detecting angular position of a body by wireless means, comprising a radio transmitter and antenna, multiple polarized transmit antennas, multiple polarized receive antennas rigidly attached to a base station, said antennas placed at selected angles on transmit body and receive station, measuring the amplitude of the received signals, and calculating the angular position between the transmit body and receive station from the ratios of the signals from the receive antennas.

5. A method for detecting angular position of a body as in claim 4 in which there are multiple transmitting antennas, and multiple receive antennas, measuring the signal strength of said receive antennas, and computing multiple angular positions.

* * * * *